Patented Aug. 7, 1951

2,563,631

UNITED STATES PATENT OFFICE 2,563,631

METHOD OF PREPARING LIQUID COPOLYMERS OF ETHYLENE AND STYRENE

David W. Young, Roselle, and William H. Smyers, Westfield, N. J., assignors to Standard Oil Development Company, a corporation of Delaware No Drawing. Application October 9, 1947, Serial No. 778,754

5 Claims. (Cl. 260—669)

1

This invention relates to the preparation and use of new copolymers of hydrocarbons, and it relates more specifically to copolymers of ethylene and styrene.

The polymerization of ethylene can be accomplished under high temperature and pressure by oxygen promotion, but not at low temperature with Friedel-Crafts catalyst under conditions such as are found satisfactory for polymerizing isobutylene or copolymerizing it with styrene.

The preparation of low molecular weight copolymers of ethylene and styrene, i. e., liquid copolymers, has not heretofore been accomplished, so far as known. The copolymerization of isobutylene and higher olefins is known and offers little difficulty. For example, isobutylene and styrene may be readily copolymerized by adding to a mixture of the components a catalyst solution containing a low percentage of a Friedel-Crafts type catalyst. Ethylene, however, cannot be copolymerized with styrene or styrene derivatives in this manner.

It is an object of the present invention to provide a method whereby good yields of a liquid copolymer of ethylene and styrene or of ethylene and certain derivatives and analogs of styrene may be obtained; the products being useful in many applications, particularly as thickeners and viscosity index improvers for mineral lubricating oils and soap-oil greases. These products have unusual shear stability and thus are quite stable under heavy usage in lubrication.

The method of the present invention may be illustrated by stating the conditions which have been found necessary to produce a copolymer of ethylene and styrene having a molecular weight within the range of about 500 to 5,000. It has been found necessary to employ a relatively concentrated solution of the Friedel-Crafts catalyst, i. e., of the order of 1 gram or more, preferably 2 to 20 grams, per 100 ml. of catalyst solution. The most preferred catalysts are the aluminum halides, such as aluminum chloride and aluminum bromide, as well as titanium tetrachloride and boron trifluoride. The preferred solvents for these catalysts are the alkyl chlorides containing 2 to 5 carbon atoms. Ethyl chloride is especially preferred and mixtures of ethyl and methyl chloride have been found satisfactory.

It has been found necessary, in addition to using strong catalyst solutions, to bring about the reaction by simultaneously introducing the two components of the copolymer into the catalyst solution. This can be done by passing a mixture of ethylene and styrene in gaseous form into

2 the catalyst solution or by separately and simultaneously passing the two reactants into the solution. It is not sufficient, however, to merely add a portion of the catalyst or catalyst solution to a mixture of the reactants.

It is desirable to carry out the above described reaction in a temperature range from −80° to +50° C. and the most preferable range is from −50° C. to +20° C. It is generally desirable to carry out the reaction under a slight pressure, i. e., of the order of 2 to 5 atmospheres absolute pressure, with water cooling, although the pressure range may vary from 1 to 10 atmospheres.

Beside styrene itself, other similar compounds may be copolymerized with ethylene by the method herein described. Such other compounds include substitution derivatives of styrene, wherein halogen atoms or aliphatic groups containing up to 4 carbon atoms are substituted either in the nucleus or in the side chain of styrene. Typical substitution products useful for this purpose are methyl styrene, alpha methyl-p-methyl styrene, p-chlorostyrene, 2,4-dichlorostyrene, and the like. Substitution products containing oxygen, nitrogen and polar groups in general cannot be used. Mixtures of styrenes of the type described may be employed as well as individual compounds.

As to the proportions of styrenes or substituted styrenes in the copolymer, it is preferable to employ from 1 to 30% by weight of the styrene or similar component, and for products to be used in lubricating oils it is generally preferable to employ portions of from 1 to 30% of styrene and the like. Modified forms of the copolymers of the present invention may be prepared by adding a minor proportion of a diolefin, of the order of 0.1 to 10%, to the reaction mixture. Preferred additional reactants of this type are isoprene and divinyl benzene, and it is generally preferred to use from 0.1 to 5% of such compounds.

The following examples illustrate the preparation and testing of a number of products prepared in accordance with the method of the present invention, but these examples are not to be considered as limiting the scope of the invention in any way.

*Example 1*

Ethylene gas was passed at the rate of 2 cu. ft. per hour through a flask containing liquid styrene at room temperature and the mixed gases were simultaneously passed into a saturated solution of aluminum chloride in ethyl chloride (about 8 g. per 100 ml. solution) at room temperature. After the polymerization reaction had been under way for about one hour, during which the temperature was about 12° C., the process was discontinued and 20 ml. of isopropyl alcohol was added to stop the activity of the catalyst and the excess of ethyl chloride removed by heating for 2 hours at 50° C. The catalyst was removed by washing the polymer with water and aqueous hydrochloric acid. A portion of this polymer, which contained 20% styrene and which per se had a viscosity of 150.1 stokes at 25° C., a viscosity index of 90, and a molecular weight of about 4000, was added to a lubricating oil in 3% concentration by weight, thereby raising the Saybolt viscosity at 210° F. from 38 to 47 and raising the viscosity index of the oil from 13 to 62.

*Example 2*

Ethylene gas was passed through liquid styrene at room temperature. The mixture of ethylene gas and styrene vapor was passed into a mixture of equal weight proportions of ethyl chloride and methyl chloride containing 2.3 g. $AlCl_3$ per 100 ml. of solution. The mixed catalyst was held at a temperature of −25° C. under reflux during the process, which continued for 3 hours. The polymer oil product was removed from the catalyst by washing with alcohol and with water. The dried copolymer oil showed a viscosity at 100° F. of 107.4 centistokes or 496.2 seconds Saybolt at 100° F.

*Example 3*

For the comparison of the shear stability of a copolymer of ethylene and styrene with a polymer of isobutylene, comparable solutions were prepared, both having a viscosity of 1400 seconds Saybolt at 100° F. The solvent for each polymer was a petroleum oil fraction having a viscosity of 1035.8 seconds Saybolt at 100° F., 59.7 seconds at 210° F., and a viscosity index of −77.6. The ethylene-styrene copolymer was prepared according to the method of Example 1, and the polyisobutylene had a molecular weight of 4,820. These solutions, having an original viscosity of 1400 seconds at 100° F., were tested by passing through a capillary having a radius of 0.0109 cm. and a length of 1.657 cm. under a pressure of 2200 to 2700 lbs./sq. in. The alteration in viscosity of the two solutions after various numbers of passes through the capillary are shown in the following table:

| No. of Passes | Viscosity (Saybolt, at 100° F.) | |
|---|---|---|
| | Ethylene-Styrene Copolymer | Isobutylene Polymer |
| 0 | 1,400 | 1,400 |
| 1 | 1,340 | 1,290 |
| 5 | 1,300 | 1,240 |
| 8 | 1,300 | 1,220 |
| 12 | 1,300 | 1,210 |
| 15 | 1,300 | 1,210 |

*Example 4*

An improved moisture-proof lacquer was made by the use of the styrene-ethylene copolymer as made according to Example 1. In this work cyclized rubber and petroleum wax were used. The composition of the lacquer was as follows (in parts by weight):

| | |
|---|---|
| Cyclized rubber | 100.00 |
| 137° AMP paraffin wax | 1.67 |
| Styrene-ethylene copolymer oil | 5.00 |
| Microcrystalline wax | 13.33 |
| Diisobutylene | 200.00 |
| Triisobutylene | 80.00 |
| Toluene | 200.00 |

This product when coated on paper was very satisfactory from the standpoint of gloss, blocking, moisture vapor resistance, heat sealing, and aging.

*Additional preparations*

Several preparations of copolymers of ethylene and styrene were carried out according to the method of Example 1, resulting in copolymers containing varying proportions of styrene. These varying amounts of styrene were introduced into the polymers by varying the temperature of the styrene through which the ethylene feed was passed. Higher temperatures produced greater vapor pressures of styrene and hence a larger amount of the latter was entrained by the ethylene gas. The proportions of styrene in the various polymers were determined by carbon and hydrogen analyses. The refractive indices for the various products and for pure ethylene and pure styrene are shown in the following table:

| Per Cent Styrene | Ref. Index |
|---|---|
| 0 | 1.510 |
| 2.5 | 1.512 |
| 5 | 1.514 |
| 10 | 1.518 |
| 12.5 | 1.520 |
| 19 | 1.526 |
| 80 | 1.577 |
| 100 | 1.595 |

The copolymers of ethylene with styrene and styrene derivatives prepared in accordance with the methods of the present invention are products having a wide variety of uses. Beside being useful as additives for lubricating oils as described above, these copolymers, particularly the lighter fractions thereof, may be added to gasoline as solvent oil or gum flux, or to keresene and gas oil fractions; they may be employed as general solvents for resins, insecticides, etc.; they may be emulsified with water and employed as textile oils; they may be employed as dielectrics in electrical equipment; and they may be employed as plasticizers for many types of materials, such as natural rubber, butyl rubber, butadiene-styrene and butadiene-acrylonitrile synthetic type rubbers, neoprene polymer, ethyl acrylate synthetic rubber, Lactoprene EV, low molecular weight polybutadiene, resinous copolymers of butadiene and diisobutylene, solid tehylene polymers, styrene-isobutylene copolymers, polyvinyl chloride, high molecular weight polybutene, and polystyrene; and they may be compounded with wax, asphalt, or petrolatum, and with fatty oils, such as linseed oil, cottonseed oil, factice, etc. They may be used per se as synthetic oils for lubricating purposes or as hydraulic oils, etc. These copolymers made hot-melt wax compounding agents of better heat-stability than polymeric products comprising isobutylene.

The invention is not to be limited to specific embodiments shown nor by the specific examples described, but solely by the terms of the appended claims.

We claim:

1. The method of preparing a copolymer of ethylene and styrene which comprises preparing a mixture of the components containing 1 to 30% by weight of styrene and passing such mixture in gaseous form into an alkyl halide solution consisting essential of 2 to 20 grams of a Friedel-Crafts catalyst per 100 ml. of solution, at a temperature of 0 to 20° C. and under an absolute pressure of 2 to 5 atmospheres.

2. A method according to claim 1 in which catalyst is aluminum halide.

3. A method according to claim 1 in which the catalyst is aluminum chloride.

4. A method according to claim 1 in which the catalyst solvent is ethyl chloride.

5. A method of preparing a copolymer of ethylene and styrene which comprises preparing a mixture of the components containing 1 to 30% by weight of styrene and passing such mixture in gaseous form into an ethyl chloride solution consisting of 2 to 20 grams of aluminum chloride per 100 ml., at a temperature of 0 to 20° C. and under an absolute pressure of 2 to 5 atmospheres.

DAVID W. YOUNG.
WILLIAM H. SMYERS.

REFERENCES CITED

The following references are of record in the file of this patent:

UNITED STATES PATENTS

| Number | Name | Date |
|---|---|---|
| 1,745,028 | Ricard | Jan. 28, 1930 |
| 2,200,429 | Perrin et al. | May 14, 1940 |
| 2,327,705 | Frolich et al. | Aug. 24, 1943 |
| 2,420,689 | Sturrock | May 20, 1947 |
| 2,421,082 | Pier | May 27, 1947 |
| 2,433,372 | Kress | Dec. 30, 1947 |
| 2,436,614 | Sparks et al. | Feb. 24, 1948 |
| 2,442,643 | Elwell et al. | June 1, 1948 |